(12) United States Patent
Takeuchi et al.

(10) Patent No.: US 7,103,128 B2
(45) Date of Patent: Sep. 5, 2006

(54) DATA SYNCHRONIZATION CIRCUIT AND COMMUNICATION INTERFACE CIRCUIT

(75) Inventors: Katsuhiko Takeuchi, Kawasaki (JP); Hirohide Sugahara, Kawasaki (JP); Shinichi Utsunomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 779 days.

(21) Appl. No.: 10/093,648

(22) Filed: Mar. 8, 2002

(65) Prior Publication Data

US 2003/0081707 A1    May 1, 2003

(30) Foreign Application Priority Data

Oct. 31, 2001  (JP)  ............... 2001-333819

(51) Int. Cl.
*H04L 7/00*     (2006.01)
*H04L 25/38*    (2006.01)
*H04L 25/00*    (2006.01)

(52) U.S. Cl. ....................... 375/372; 375/354
(58) Field of Classification Search ........... 370/509; 341/67; 713/400
See application file for complete search history.

(56) References Cited

U.S. PATENT DOCUMENTS

| | | | |
|---|---|---|---|
| 4,935,942 A | * 6/1990 | Hwang et al. | ............... 375/354 |
| 5,056,120 A | * 10/1991 | Taniguchi et al. | .......... 375/371 |
| 5,077,761 A | * 12/1991 | Tokunaga | ................. 375/371 |
| 5,430,772 A | * 7/1995 | Lee et al. | .................. 375/363 |
| 6,334,163 B1 | * 12/2001 | Dreps et al. | ............... 710/260 |
| 6,356,566 B1 | * 3/2002 | Lee et al. | .................. 370/509 |
| 6,437,712 B1 | * 8/2002 | Aoki | ........................... 341/67 |
| 6,542,999 B1 | * 4/2003 | Dreps et al. | ............... 713/400 |

FOREIGN PATENT DOCUMENTS

JP          59-003544          1/1984

* cited by examiner

*Primary Examiner*—Dac Ha
*Assistant Examiner*—Linda Wong
(74) *Attorney, Agent, or Firm*—Greer, Burns & Crain, Ltd

(57) ABSTRACT

There is provided a data synchronization circuit for synchronizing a (n+1) (n: natural number) bit bus data synchronous with a first clock with a second clock, comprising: a first circuit for holding the bus data which is synchronous with the first clock and is input at each predetermined timing; a second circuit for generating a first timing signal which is synchronous with the first clock and is corresponding to the predetermined timing; a third circuit for generating a second timing signal which is synchronous with the second clock, from the first timing signal; and a fourth circuit for receiving the bus data output from the first circuit based on the second timing signal, to output the bus data in synchronism with the second clock.

4 Claims, 4 Drawing Sheets

DATA SYNCHRONIZATION CIRCUIT AND COMMUNICATION INTERFACE CIRCUIT

BACKGROUND OF THE INVENTION

1. Field of the Invention

The present invention relates generally to a communication interface circuit for transmitting and receiving data, and more particularly to a data synchronization circuit for transferring data between different clocks and to a communication interface circuit including the same.

2. Description of the Related Art

For example, in a communication interface for controlling a data communication between a personal computer and a device such as its peripheral device (for example, a hard disk drive, or the like) or the like, when speeds of a reception side clock and a transmission side clock are different, it becomes necessary to synchronize data between the different clocks. In particular, in a communication interface circuit in which line data to be transmitted at a predetermined clock speed in a communication line are required to convert into internal bus data to be transferred at another clock speed (or its inverse conversion), it is necessary to synchronize the bus data between the different clocks in the interior.

For synchronizing data between the different clocks and transferring the data between circuit blocks operating in clocks differing from each other, a method for using a buffer memory and a method for performing hand-shaking are known. In the method for using the buffer memory, in order to absorb a clock difference between the blocks, the data from the circuit block on a transmission side have once been accumulated in the buffer memory, and the data are output to the circuit block on a reception side in synchronism with the clock of the circuit block on the reception side. In the method for performing hand-shaking, a determination of a communication method, a protocol or the like has in advance been made between the circuit block on the transmission side and the circuit block on the reception side prior to the transmission and reception of the data, and the data is transmitted and received according to the determination.

However, in the method for using the buffer memory, a space for the buffer memory (and a buffer memory test circuit or the like) is required in the interior of the communication interface circuit, and this leads to an obstacle to a downsizing of the communication interface circuit, in its turn a device housing the circuit. Furthermore, a control signal between the circuit blocks is also required, and this makes the control complicated. Furthermore, in the method for performing the hand-shaking also, a control signal and a control circuit therefor are required. This leads to an obstacle to the downsizing of the communication interface circuit, and this makes its configuration complicated. Furthermore, when performing the hand-shaking, a communication speed is relatively late and it is not suitable for a high-speed transfer.

SUMMARY OF THE INVENTION

It is therefore the object of the present invention to provide a data synchronization circuit capable of synchronizing data between different clocks with a space saving and simple configuration in a communication interface circuit needing transfer of data between the different clocks.

In order to achieve the above object, according to an aspect of the present invention there is provided a data synchronization circuit for synchronizing a (n+1) (n: natural number) bit bus data synchronous with a first clock with a second clock, comprising:

a first circuit for holding the bus data which is synchronous with the first clock and is input at each predetermined timing;

a second circuit for generating a first timing signal which is synchronous with the first clock and is corresponding to the predetermined timing;

a third circuit for generating a second timing signal which is synchronous with the second clock, from the first timing signal; and a fourth circuit for receiving the bus data output from the first circuit based on the second timing signal, to output the bus data in synchronism with the second clock.

By virtue of the above configuration, it is possible to provide a data synchronization circuit in which a bus data synchronous with a first clock is synchronized with a second clock using a simple and space saving circuit configuration. Furthermore, the communication interface circuit including the data synchronization circuit is provided.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENT

Hereinafter, a preferred embodiment of the present invention will be described. It is to be understood, however, that the technical scope of the present invention is not limited to the embodiment.

Figure 1:
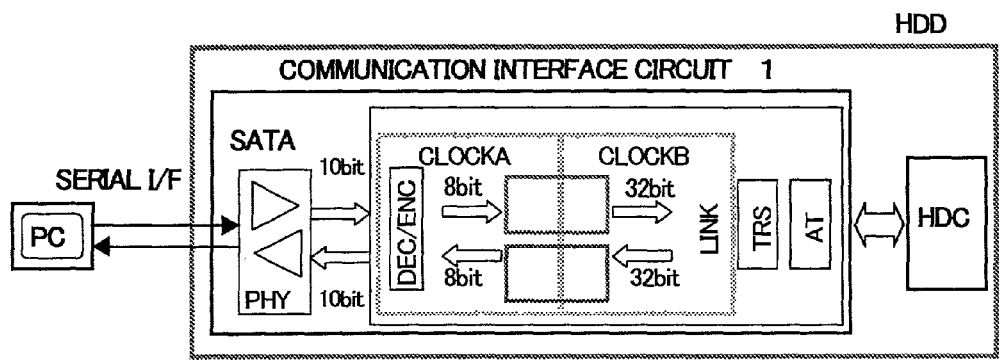
FIG. 1 is a diagram of a schematic configurational example of the overall system according to an embodiment of the present invention.

FIG. 1 is a schematic configurational example of the overall system containing a communication interface circuit according to the embodiment of the present invention. For example, a personal computer (PC) is connected to an externally equipped hard disk drive (HDD) via a communication interface circuit 1 to mutually transmit and receive data. A communication interface is a serial ATA (Advanced Technology Attached) (SATA), for example. The serial ATA is a serial interface into which a technique of Giga bit Ethernet is introduced, and is at a higher speed than a parallel ATA in the prior art. Furthermore, due to a serial communication, signals are smaller and also a cable length is more extensible than the parallel ATA.

Since line data (serial data) to be transmitted and received via a communication line are converted into internal (n+1) bit bus data, the communication interface circuit 1 in correspondence to the serial ATA (SATA) has a physical layer (PHY) corresponding to an analog part, a link layer (Link) corresponding to a logic part, a transport layer (TRS) and an application layer (AT).

As shown in FIG. 1, the serial data to be transmitted from a PC side is received by the communication interface circuit 1 in the hard disk drive (HDD). The communication interface circuit 1 converts the received line data (serial data) into 10-bit bus data (parallel data) in the physical layer (PHY), and encodes the 10-bit data to 8-bit data in the link layer (Link), to then configure 32-bit data by combining four pieces of the 8-bit data, and transfers the 32-bit data to the transport layer (TRS). At this time, the link layer absorbs a speed difference between a clock (ClockA) of the physical layer and a clock (ClockB) of the transport layer and later, it is necessary to synchronize the bus data within the Link layer.

For example, when a transfer speed of the serial data to be transmitted from the personal computer is set to 1.5 GHz, as it is converted into the 10-bit data by the physical layer, the clock (ClockA) on the physical layer side is 150 MHz. On the other hand, the transport layer and later are operated, for example, at the clock (ClockB) of a hard disk controller (HDC) of the hard disk drive, for example, 100 MHZ.

The data transfer from the hard disk drive (HDD) to the personal computer (PC) is reverse to the above description. That is, the 32-bit data transmitted from the hard disk controller (HDC) are disassembled to 4 pieces of 8-bit data, and it is decoded to 10-bit data, and the 10-bit data are converted into the serial data, which are transferred to the personal computer as line data via a communication line.

Figure 2:
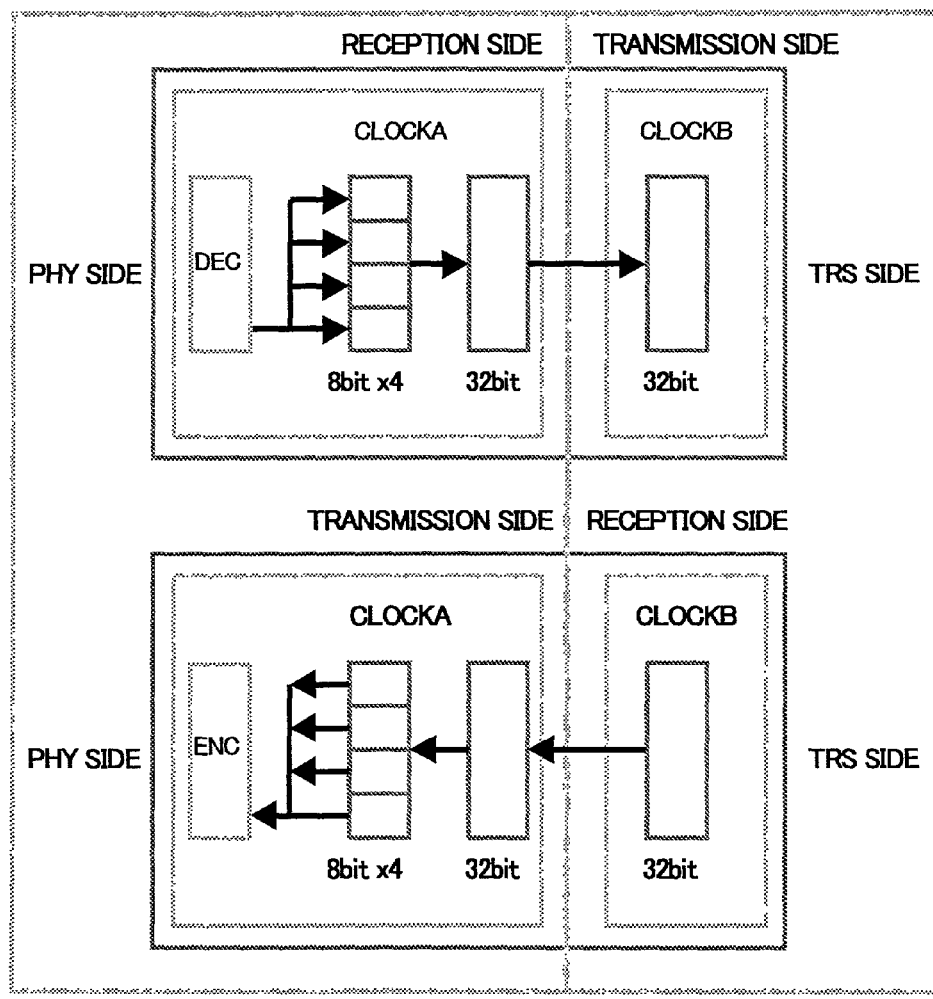
FIG. 2 is a detailed diagram of a Link layer in FIG. 1.

FIG. 2 is a detailed diagram of the link layer (Link) in FIG. 1. As shown in FIG. 2, in the link layer, when the 32-bit data configured by combining 4 pieces of 8-bit data are transferred between different clocks, the data are required to synchronize with each clock. In this manner, when a plurality of bits of bus data are transferred between the different clocks, a data synchronization circuit for synchronizing the bus data with each clock is required. Hereinafter, the bus data are occasionally referred to as data, solely.

Figure 3:
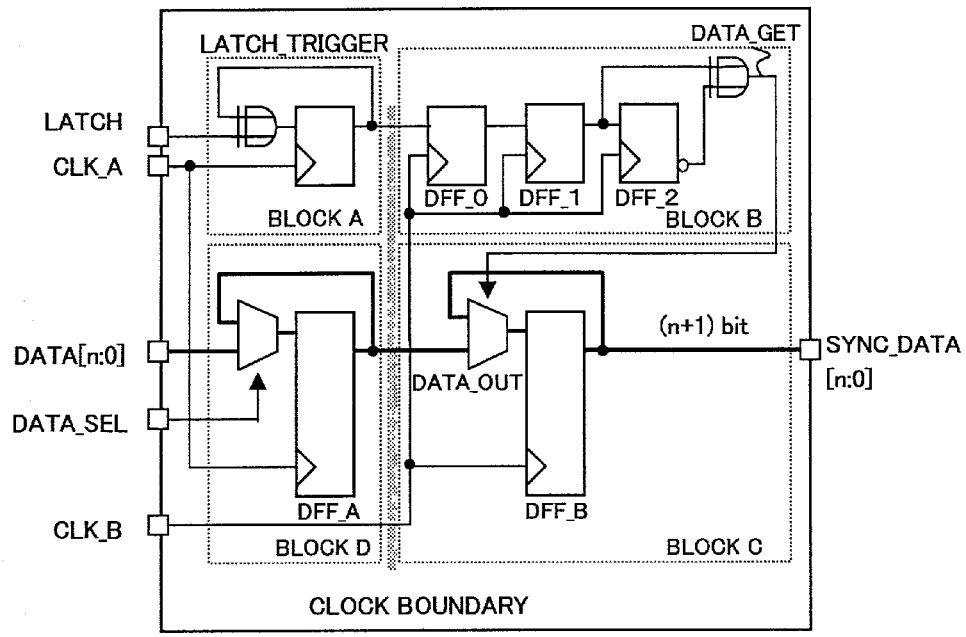
FIG. 3 shows a configurational example of a data synchronization circuit according to the embodiment of the present invention.

FIG. 3 is a configurational example of the data synchronization circuit according to the embodiment of the present invention. The data synchronization circuit configuring a part of a communication interface circuit 1 comprises, for example, a latch timing formation circuit (block A), a reception timing formation circuit (block B), a reception-side data hold circuit (block C), and a transmission-side data hold circuit (block D). At this time, the blocks A, D are operated in synchronism with clock CLK_A, and the blocks B, C are operated in synchronism with clock CLK_B.

(n+1) bit (n: natural number) data input into the block C in synchronism with the clock CLK_A are held in (n+1) pieces of data flip-flop DFF_A of the block D, and as described later, (n+1) pieces of data flip-flop DFF_B of the block C fetch in data from the block C in accordance with a reception timing signal in synchronism with the clock CLK_B, and output in synchronism with the clock CLK_B.

The block A is the latch timing formation circuit for forming a latch timing signal for latching data to be transmitted from the block D to the block C, and is configured by a single data flip-flop, for example. The block A outputs the latch timing signal (latch_trigger) based on a latch signal (Latch) to be input at a predetermined timing corresponding to an input timing of the data.

The block B is the reception timing formation circuit which absorbs a speed difference between the clock CLK_A and the clock CLK_B, and forms a reception timing signal for receiving data transmitted from the block D to the block C, and is configured by a plurality of (preferably, there or more) data data flip-flops, for example. The block B forms the reception timing signal (data_get) in synchronism with the block CLK_B based on the latch timing signal from the block A.

The block C is a reception-side circuit for holding (n+1)-bit data to be input from the block D, and is configured by the data flip-flops of each bit. The block C fetches in the data data_out from the block D in accordance with the reception timing signal data_get in the block B, and outputs the data as data SYNC_DATA at a next clock timing.

The block D is a transmission-side circuit for holding (n+1)-bit data to be input, and is configured by the data flip-flops of each bit. The block D holds the data DATA fetched in accordance with a select signal DATA_SEL, and further outputs the data as a data signal data_out.

Figure 4:
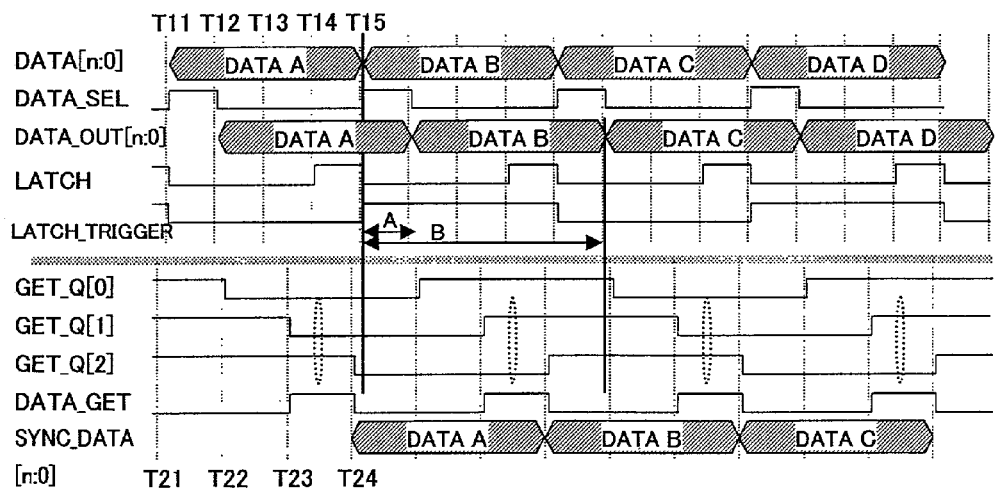
FIG. 4 is a timing chart of a circuit of FIG. 3.

FIG. 4 is a flowchart of the data synchronization circuit shown in FIG. 3. First of all, a clock CLK_A side fetches in the data DataA to be input into the block D at timing T11 in accordance with the select signal DATA_SEL, and outputs the data from DFF_A at next timing T12.

On the other hand, in accordance with the latch signal (Latch) to be input at timing T10 (not shown) one before timing T11, the data flip-flop of the block A outputs the latch timing signal (latch_trigger) at timing T12. According to this embodiment, as 4 pieces of 8-bit data are combined to configure 32-bit data, data are input into the block D every 4 clocks and the latch signal (Latch) synchronizes with the input timing to be a 4-clock period.

Next, on a clock CLK_B side, at next timing T22 when the latch timing signal (latch_trigger) is input into the block B, a data flip-flop DFF_0 of a first stage of the block B outputs a signal get_q[0], and at next timing T23, a data flip-flop DFF_1 of a second stage outputs a signal get_q[1], and further at next timing T24, a data flip-flop DFF_2 of a third stage outputs a signal get_q[2]. Based on an output signal of DFF_1 of the second stage and an output signal of DFF_2 of the third stage, a reception timing signal (data_get) is formed at timing T23 and is supplied to the block C. At this timing T23, the data data_out output from the block D are fetched into DFF_B of the block C, and are, at next timing T24, output as data SYNC_DATA in synchronism with the clock CLK_B.

Data DataB, DataC, . . . subsequent to data DataA input into the block D are in the same manner. That is, each data synchronizing with the clock CLK_A is fetched into the block C based on the reception timing signal (data_get) synchronizing with CLK_B, and is output in synchronism with the clock CLK_B.

Incidentally, the circuit configuration example shown in FIG. 3 is effective under the below conditions.

(1) When the clock CLK_B is slower than the clock CLK_A (in the case shown in FIG. 4), during a period (hold period H) when the data DataA, DataB, . . . are held by the block D on the clock CLK_A side (a period from an input of the data into the block C to an output thereof; 5 clocks in the case of FIG. 4), it is necessary that the data are fetched into the block C on the clock CLK_B side according to the reception timing signal data_get. Furthermore, for forming the reception timing signal data_get, a period of m clocks is required by the plurality of (preferably, three or more) flip-flops. Accordingly, the clock CLK_B necessitates a speed of CLK_B=CLK_A×m/H or more with respect to the clock CLK_A.

For example, when the clock CLK_A is 150 MHZ and hold period H=5 clocks and the number of stages of D-FF=3, the clock CLK_B necessitates a speed of 150×3/5=90 MHz or more.

(2) In the case where the clock CLK_B is faster than the clock CLK_A, when the data are not output from the clock C, as the clock CLK_B side does not fetch the data, the reception timing signal data_get is required to output after 1 clock period P of the clock CLK_A passes from the timing when the data were input into the block C. The reception timing signal data_get is output after (m−1) clock period P of the clock CLK_B passes from an output timing of an output signal (for example, the signal get_q [1] in FIG. 4) from DFF of (m−1) stages in DFF of the plurality of (m) stages in the block B, namely the timing when the data were input into the block C. Therefore, the clock CLK_B necessitates a speed of CLK_B=CLK_A×(m−1)

or less with respect to the clock CLK_A.

For example, when the clock CLK_A is 150 MHz and the number of stages m of DFF=3, the clock CLK_B necessitates a speed of 150×(3−1)=300 MHz or less.

When the above conditions are not satisfied (in the case where the clock CLK_B is slower than the clock CLK_A, when the number of clocks of the clock CLK_B required for forming the reception timing signal data_get during a data hold period on the clock CLK_A side cannot been ensured, and in the case where the clock CLK_B is faster than the clock CLK_A, when the clock CLK_B side outputs the reception timing signal data_get prior to an output of the data from the clock CLK_A side), circuits of FIG. 3 are provided only in the necessary number of 2 or more which satisfies the above conditions, and the data have only to be input alternately (or in order).

Figure 5:
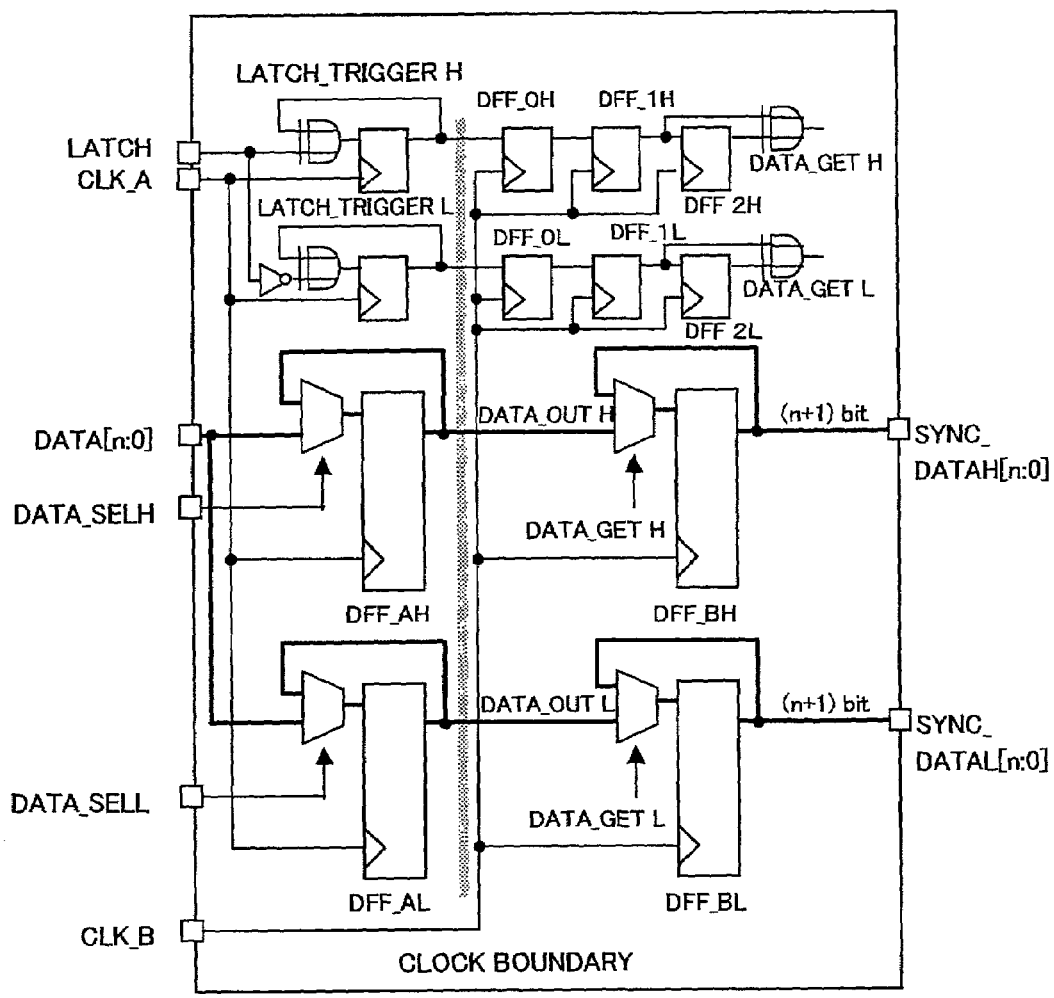
FIG. 5 shows another configurational example of the data synchronization circuit according to the embodiment of the present invention.
Figure 6:
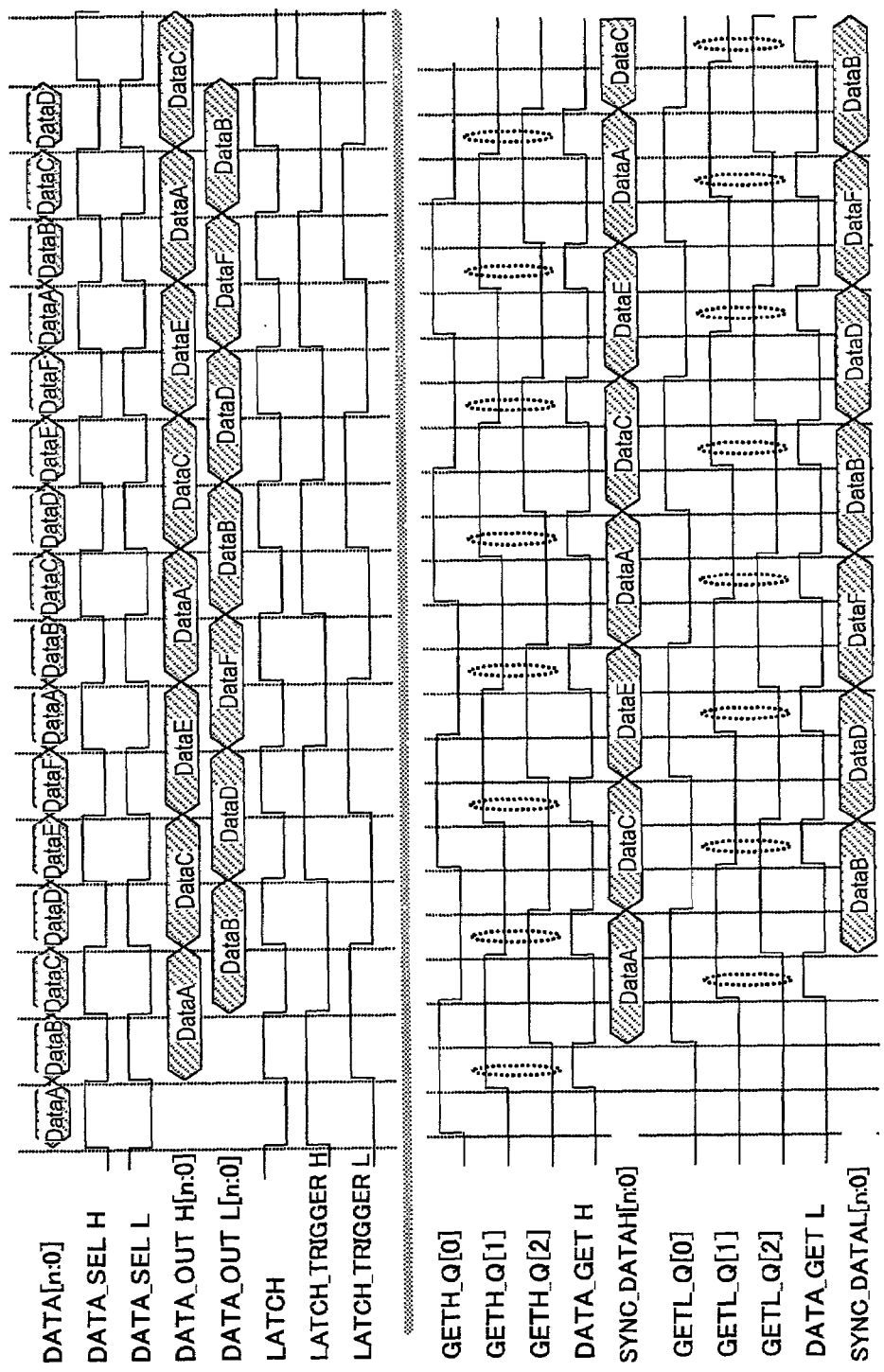
FIG. 6 is a timing chart of a circuit of FIG. 5.

FIG. 5 is another configurational example of the data synchronization circuit according to the embodiment of the present invention, and this is a circuit configurational example in which two data synchronization circuits of FIG. 3 are combined, and FIG. 6 is a timing chart of the circuit of FIG. 5. In FIGS. 5 and 6, the data DATA to be input are alternately input into data flip-flops DFF_AH and DFF_AL according to select signals DATA_SELH and DATA_SELL, and outputs signals data_outh and data_outl from each data flip-flop are fetched into data flip-flops DFF_BH and DFF_BL on the clock CLK_B side in accordance with reception timing signals data$_{13}$ geth and data_getl, and are output as data SYNC_DATAH and SYNC_DATAL synchronizing with the clock CLK_B.

The above embodiment was explained by exemplifying the serial ATA interface, but the present invention is applicable to the other interfaces, for example, SCSI or the like.

Furthermore, in the above embodiment, when the line data to be transmitted in the communication line are serial data, there is a tendency toward increase of a clock difference within the interior of the communication interface circuit. Therefore, it is particularly effective, and the line data are not limited to the serial data, but may be parallel data.

As described above, according to the present invention, as it becomes possible to synchronize data between the different clocks by not using either the buffer memory, or the hand shaking, it becomes possible to transfer the data at a high speed between the different clocks. Furthermore, this contributes to a downsizing of the communication interface circuit and a decrease in cost. Furthermore, since various control signals and control circuits are unnecessary, a design is facilitated and a design time is shortened.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art. The protective scope of the present invention is not limited to the above embodiment but covers the invention defined by claims and its equivalent.

What is claimed is:

1. A data synchronization circuit for synchronizing a (n+1) (n: natural number) bit bus data synchronous with a first clock with a second clock, comprising:
   a first circuit for holding the bus data which is synchronous with the first clock and is input at each predetermined timing;
   a second circuit for generating a first timing signal which is synchronous with the first clock and is corresponding to the predetermined timing;
   a third circuit for generating a second timing signal which is synchronous with the second clock, from the first timing signal; and
   a fourth circuit for receiving the bus data output from the first circuit based on the second timing signal, to output the bus data in synchronism with the second clock.

2. A data synchronization circuit according to claim 1, wherein
   the third circuit includes a plurality of flip-flop circuits.

3. A communication interface circuit for transmitting and receiving a line data to be transmitted through a communication line, comprising:
   a conversion circuit for converting the line data into (n+1) (n: natural number) bit bus data to be internally transferred and for converting the bus data into the line data; and
   a data synchronization circuit for synchronizing the bus data synchronous with a first clock with a second clock, the data synchronization circuit including: a first circuit for holding the bus data which is synchronous with the first clock and is input at each predetermined timing;
   a second circuit for generating a first timing signal which is synchronous with the first clock and is corresponding to the predetermined timing;
   a third circuit for generating a second timing signal which is synchronous with the second clock, from the first timing signal; and
   a fourth circuit for receiving the bus data output from the first circuit based on the second timing signal, to output the bus data in synchronism with the second clock.

4. A communication interface circuit according to claim 3, wherein
   the line data is a serial data.

* * * * *